DECODING APPARATUS FOR CONTINUOUS INDUCTIVE TRANSMISSION SYSTEM

Filed Jan. 24, 1963 3 Sheets-Sheet 1

INVENTOR.
S. REICH
BY Forest B. Hitchcock
HIS ATTORNEY

DECODING APPARATUS FOR CONTINUOUS INDUCTIVE TRANSMISSION SYSTEM

Filed Jan. 24, 1963 3 Sheets-Sheet 2

INVENTOR.
S. REICH

BY
Forest B. Hitchcock
HIS ATTORNEY

Sept. 13, 1966 S. REICH 3,272,979

DECODING APPARATUS FOR CONTINUOUS INDUCTIVE TRANSMISSION SYSTEM

Filed Jan. 24, 1963 3 Sheets-Sheet 3

INVENTOR.
S. REICH
BY
Forest B. Hitchcock
HIS ATTORNEY

United States Patent Office 3,272,979
Patented Sept. 13, 1966

3,272,979
DECODING APPARATUS FOR CONTINUOUS INDUCTIVE TRANSMISSION SYSTEM

Simon Reich, Rochester, N.Y., assignor to General Signal Corporation, Rochester, N.Y., a corporation of New York Filed Jan. 24, 1963, Ser. No. 253,612
11 Claims. (Cl. 246—63)

The present invention relates generally to railway traffic control systems of the continuous inductive coded type, and more particularly to an improved system for decoding information which is received in the form of energy that recurs at selected code rates.

The continuous inductive coded type system, is one in which energy in the track rails, or a wire loop at the wayside, is coded at selected rates in accordance with traffic conditions. This coded energy, which may be a carrier frequency that is interrupted at different code rates from 50 to 300 times per minute, for example, is transferred constantly to a receiving means mounted on the train in inductive relationship to the rails, or the wire loop, as the case may be. The received coded energy is filtered and amplified to operate a train carried code following means, which in turn governs the operated condition of car carried devices through a decoding apparatus that is selectively responsive to the code rate at which the code following means is operated.

Conventional decoding apparatus for continuous inductive coded systems is comprised of a code following relay that is connected to a master transformer such that the master transformer provides an A.C. voltage at a frequency corresponding to the rate at which the code following relay is operated. This transformer is connected in multiple to a plurality of distinctively tuned decoding circuits. Each decoding circuit, which is comprised of an inductor and a capacitor, is connected to a decoding relay through a full wave rectifier.

One of the inductance-capacitance decoding circuits is tuned to resonate at the frequency of the output voltage of the master decoding transformer in response to the operation of the code following relay at a code rate of 75 interruptions per minute, for example, to pick up its decoding relay. A second decoding circuit is tuned so that its decoding relay picks up in response to the frequency of the induced voltage at a code rate corresponding to 120 interruptions per minute, for example. A third decoding circuit is tuned to pick up its decoding relay in response to its receiving a frequency corresponding to a code rate of 180 interruptions per minute, for example.

The decoding relays in these conventional systems are so connected that when a respective one is operated in response to the fastest code rate, the train is governed to its least restrictive speed. When the slowest code rate or no code rate at all is received, the train is governed to its most restrictive speed or to a stop condition respectively. Although conventional decoding systems are reliable in operation, the number of code rates which can be communicated reliably is limited. Also, the components, particularly the master transformer and the individual inductors are large, bulky and relatively expensive.

One of the objects of the present invention is to provide an improved decoder for use in continuous inductive coded systems which permits of a larger number of individual selected code rates than is practical with conventional decoding systems.

Another object of this invention is to provide an improved decoding system and apparatus which is fail-safe in its operation, in that, any malfunction, because of an open wire, or a relay which becomes inoperative, or a catastrophic failure of any resistor, capacitor, or semiconductor, of any type does not result in a less restrictive condition.

Still another object of this invention is to provide an improved decoding apparatus and system which is reliable for a selected code rate even though the "on" time of each recurring transmission is considerably lengthened or shortened.

A further object of this invention is to provide an improved decoding system for use in continuous inductive coded systems which is small and compact, lightweight, and relatively inexpensive to manufacture.

Other objects of this invention will become apparent from the specification, the drawings and the appended claims.

Figure 1:
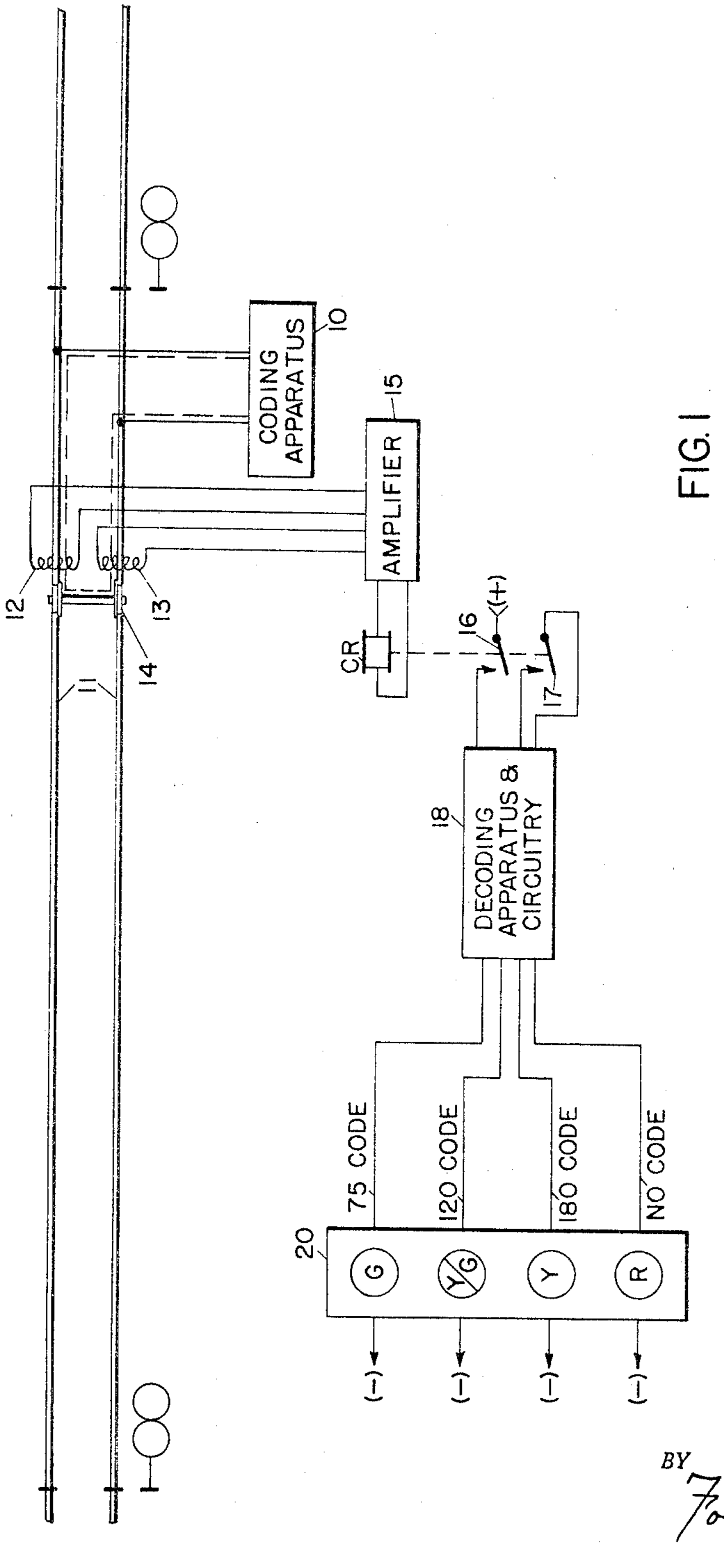
FIG. 1 is a diagrammatical illustration of one organization of a continuous inductive coded system employing the decoding apparatus according to the present invention.

Broadly speaking and without intending to limit the scope of the present invention, the decoding apparatus, which is so organized that any malfunction of components is on the side of safety of operation, is operated by a code following means that is governed by the amplifier in response to each recurrent reception of electrical energy of a predetermined characteristics. The code following means operates to a first condition upon each reception of the characteristic energy and operates to a second condition upon each cessation of the energy.

A separate timing circuit means is provided for each code rate to be decoded, and is so constituted to provide a momentary output after being activated for a particular time interval. Each timing circuit means includes an RC circuit and a unijunction transistor, and is activated by charging the capacitor through the resistor to produce, after a particular time interval, a voltage for causing the transistor to conduct.

A trigger circuit, which is a silicon controlled rectifier circuit, is provided for each timing circuit, and is caused to conduct when the voltage spike from its respective timing circuit is applied thereto. Once the silicon controlled rectifier of a trigger circuit conducts, it remains conductive until extinguished by reducing the current therethrough. Connected to the output of each silicon controlled rectifier is a relay that is energized and deenergized as governed by its conduction and nonconduction.

The train governing means in the illustrated embodiment of the invention is a cab signal, the aspects of which are selectively operated in response to the steady energization of train governing biased neutral relays. These relays are steadily energized by the periodic operation of the relays connected to the outputs of the silicon controlled rectifiers and are so constituted that any short or any open wire prevents their being energized inadvertently.

When the code following means operates to its first condition in response to an output from the amplifier at the beginning of a timing cycle, all the timing circuits are activated to start timing, and are immediately thereafter electrically connected to their respective silicon controlled rectifier trigger circuit means. The next operation of the code following means, which is to its second condition, and occurs upon the cessation of the output from the amplifier, governs various circuit means such that the next following operation of the code following means to its first condition in response to the following output from the amplifier, disconnects the silicon controlled rectifier trigger circuits from their respective timing circuits, and deactivates each of the timing circuits by discharging their capacitors.

If the time interval of a timing period between the two successive operations of the code following means to its first position corresponds to the most rapid of the code rates of the system, only one of the timing circuits is able to apply its voltage spike to fire its respective silicon controlled rectifier to energize the relay connected to its output before being disconnected. If the code rate is the slowest of a particular system all the timing circuits have an opportunity to fire their respective silicon controlled rectifiers during this timing period thus energizing all of the output relays of the system.

When the code following means is operated to its second condition subsequent to the end of this timing period, it governs circuit means of the system so that the next operation of the code following means to its first condition commences another timing period as previously described, and reduces the current through the silicon controlled rectifiers to extinguish those that were fired to deenergize their output relays.

Thus, those output relays, which are caused to be energized as governed by the code rates, are energized just prior to the end of each timing period and are deenergized at the beginning of the next timing period.

The checking circuit means, which determines the beginning and end of each timing period, is operated to one condition between each timing cycle and to its other condition during each timing cycle when the code following means is operated to its second condition. This checking circuit means must operate at the required intervals in order for the biased neutral train governing relays to be responsive to the periodic operation of its respective relays that are connected to the outputs of the silicon controlled rectifiers.

The circuit for operating the checking circuit means to its one condition between each timing cycle includes the circuit for discharging the capacitor of the timing circuits to insure that the capacitors of each timing circuit is discharged at the beginning of a timing period.

Although the specific embodiment illustrated and hereinafter described for the sake of simplicity, shows apparatus for decoding three separate code rates, a system according to the invention is capable of decoding up to ten code rates for example because of the method of timing the periods instead of detecting the frequency.

Referring in detail to the drawings, FIG. 1 illustrates the general organization of a continuous inductive system for governing the operation of railway vehicles, wherein track current coding apparatus 10 is connected at the exit end of a track section 11 to cause electrical energy to flow in the track rails of the section 11 at a selected one of a plurality of code rates. The coding apparatus 10 may assume any of several different forms, all of which are well known in the art. For example, it may be of the well known type that impresses on the track rails recurrently a carrier frequency alternating current, or of the type that impresses direct current at a selected recurrent rate. The carrier frequency or the direct current, as the case may be, is recurrently interrupted at a selected code rate to provide substantially equal "on" and "off" times.

The vehicle carried equipment is comprised of two receivers 12 and 13 which are mounted ahead of the front wheels 14 of a locomotive in a position to be inductively influenced by the recurrent energy in the track rails. The inducted voltages from the receiving coils 12 and 13 are applied in a well known manner to the input of a suitable amplifying apparatus 15. A code following relay CR is connected to the output of the amplifier 15 in a manner well known in the art so that it is energized when the amplifier detects an input as caused by the presence of the carrier frequency for example in the track rails, and is deenergized upon the cessation of the carrier frequency. Thus, the code following relay is energized and deenergized recurrently at a rate corresponding to the code rate of the carrier frequency in the track rails.

The energizing and deenergizing of the relay CR closes and opens its front contacts 16 and 17 respectively to operate decoding apparatus and circuitry 18 as will be hereinafter described in detail.

In a continuous inductive system employing the decoding apparatus and circuitry 18 in accordance with the illustrated embodiment of the invention, the various code rates are applied to the track rails so that the most rapid of the code rates of the system governs the railway vehicle to its second most restrictive condition and the slowest of the code rates governs the railway vehicle to its least restrictive condition. Thus, as illustrated, when the relay CR is energized recurrently at a code rate of 75 times per minute, cab signal 20 is caused to display its most permissive aspect G. The operation of the relay CR at a 120 code rate causes the cab signal 20 to display an aspect *Y/G* to govern the train at a medium restrictive speed. In response to a 180 code rate, the decoding apparatus and circuitry 18 causes the cab signal 20 to display its aspect Y to govern the train to its second most restrictive speed. When no code is present, the red aspect of the signal 20 is displayed. Although the decoding apparatus and circuitry 18 is illustrated and described as providing for the decoding of only three separate code rates and a no code, thus constituting four channels of information, it is understood that in accordance with the present invention many more code rates may be used. Although the decoding apparatus and circuitry 18 is shown as controlling the aspects of a cab signal 20, it is understood that it can be used to operate train control apparatus or provide other information on the vehicle such as for automatic train operation, for example. It is further understood that although the general organization of the system shows continuous inductive currents being applied to the track rails, that a wire loop may be placed along the wayside to inductively influence the receivers 12 and 13.

Figure 2:
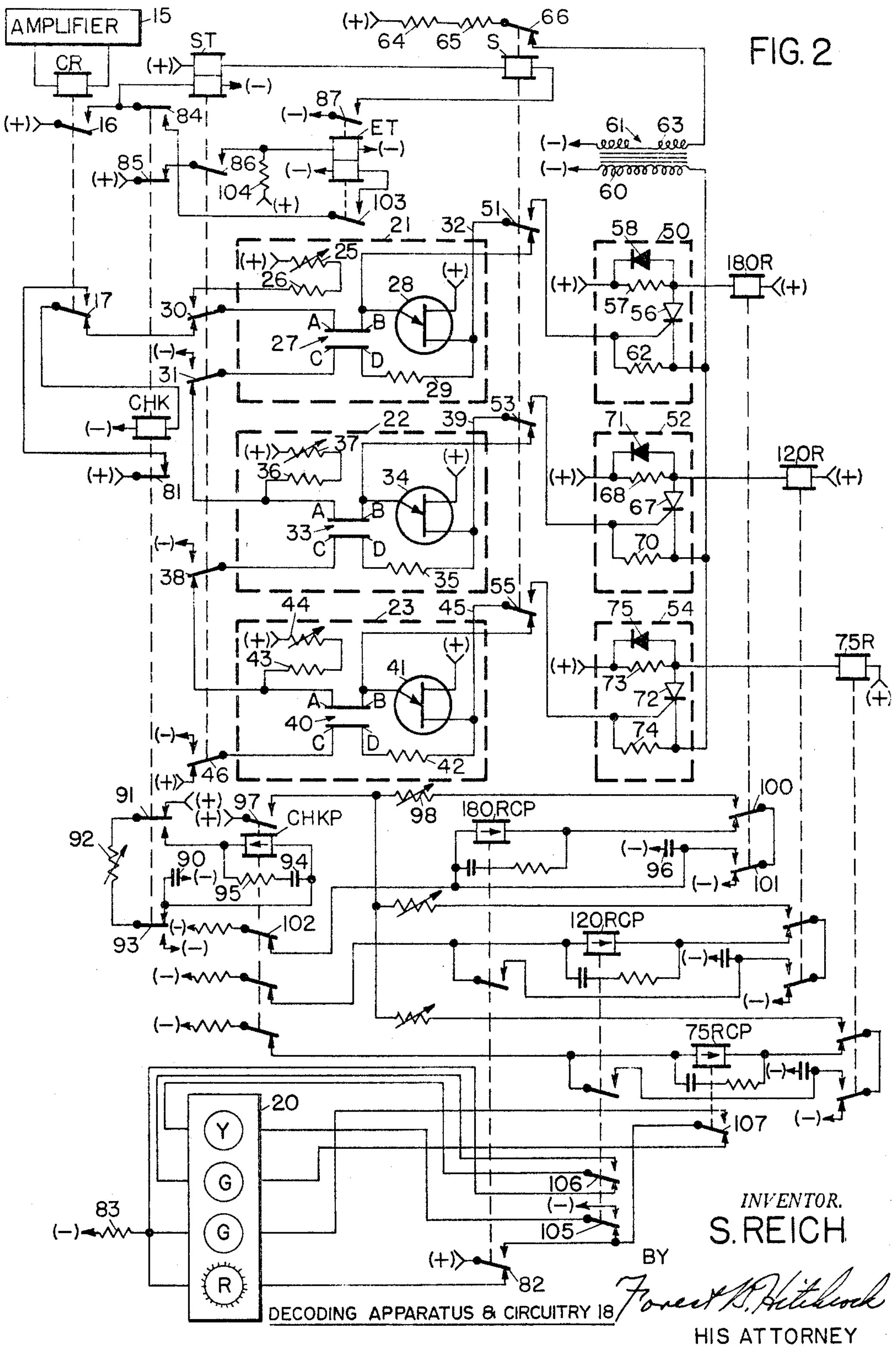
FIG. 2 is a schematic drawing of a decoding system in accordance with one embodiment of this invention; and, FIG. 3 is a graphical illustration showing the sequence of operation of a decoding system in accordance with the illustrated embodiment of the invention of different code rates.

Referring in detail to FIG. 2, the decoding apparatus 18 is comprised of a relay ST, which is energized to commence each timing period by activating simultaneously a plurality of timing circuits, generally referred to at 21, 22 and 23. These timing circuits operate to fire unijunction transistors by resistance-capacitance networks that have different time constants to differentiate the different time periods of the system.

The timing circuit 21 is comprised of a time adjusting resistor 25, a resistor 26, a capacitor 27 provided with four terminals referred to as A, B, C and D, a unijunction transistor 28, and a resistor 29. Unijunction transistors are considered reliable in that the voltage level required to cause them to conduct is uniform for a particular rating. The circuit for charging the capacitor 27 to activate the timing circuit 21 in response to the picking up of the relay ST at the beginning of each timing period, extends from (+) and includes resistor 25, resistor 26, front contact 30 of the relay ST, terminal A and C of the capacitor 27 and front contact 31 of relay ST to (−) energy. The unijunction transistor 28 has its upper base as viewed in FIG. 2 connected to positive energy, its lower base connected through resistor 29 to terminal D on the lower plate of the capacitor 27, and its emitter terminal connected to terminal B on the upper plate of the capacitor 27. When the capacitor 27 is charged so that its terminal B on the upper plate reaches a certain positive voltage value, the transistor 28 conducts through its emitter and lower base terminal, thereby discharging the capacitor 27 through the resistor 29 to produce a voltage spike on output wire 32 of the timing circuit 21. The resistor 25 is adjusted so that the time required to bring the voltage on terminal B of capacitor 27 to a value sufficient to fire the transistor 28, is slightly less than the timing period corresponding to a 180 code rate.

The timing circuit 22 which is comprised of a capacitor 33 provided with terminals A, B, C and D, a unijunction transistor 34, a resistor 35, a resistor 36, and an adjustable timing resistor 37 is connected to operate in a manner similar to the timing circuit 21. The capacitor 33 is charged to fire the transistor 34 by a circuit which includes a front contact 38 of the relay ST and the adjustable resistor 37 to produce a voltage spike on output wire 39 of the timing circuit 22. However, the resistors 36 and 37 are adjusted so that the time necessary to bring the voltage on terminal B of the capacitor 33 up to a value sufficient to fire the transistor 34, is slightly less than the timing period corresponding to a 120 code rate.

The timing circuit 23, which is comprised of a capacitor 40, a transistor 41, resistor 42, resistor 43 and adjustable resistor 44, is connected to operate to produce the voltage spike on output wire 45 in the same manner as the timing circuits 21 and 22, except that the resistors 44 and 45 are adjusted so that the time required after the closing of front contact 46 of the relay ST, to produce the voltage spike is slightly less than the timing period corresponding to a 75 code rate.

A relay S is provided to be picked up after the picking up of a relay ET at the beginning of each timing period to connect simultaneously the output wire 32 of the timing circuit 21 to trigger circuit 50, through front contact 51 of the relay S, the output wire 39 of the timing circuit 22 to a trigger circuit 52 through front contact 53 of the relay S, and the output wire 45 of the timing circuit 23 to a trigger circuit 54 through the front contact 55 of the relay S. The pick up circuit for relay S includes the upper winding of the relay ST to insure that the relay ST is energized when the relay S picks up. The relay ET is provided to be driven to its deenergized position at the end of each timing period to deenergize the relay S and disconnect the output wires 32, 39 and 45 from the respective trigger circuits 50, 52 and 54.

The trigger circuit 50 is comprised of a silicon controlled rectifier 56, the anode of which is connected to a source of positive potential through a resistor 57 and to a source of positive potential through the winding of a relay 180R. A by-pass diode 58 is connected across the resistor 57 with its negative side connected to the positive voltage source to protect the silicon controlled rectifier from inductive surges caused by the energizing and deenergizing of relay 180R. The cathode of the silicon controlled rectifier 56 is connected to a source of negative potential through a secondary winding 60 of a transformer 61. The gate terminal of the rectifier 56 is connected to front contact 51 of the relay S. The cathode and gate terminals are connected through a resistor 62. When the voltage spike from output wire 32 of the timing circuit 21 is applied to the gating terminal of the rectifier 56, it conducts to energize the relay 180R. The circuit for energizing the relay 180R extends from (+) including the winding of the relay, the anode and cathode terminals of the rectifier 56, and the secondary winding 60 of the transformer 61 to (−). Once the rectifier 56 is made conductive it will continue to conduct after the gating voltage is removed because of its inherent characteristics, which are well known in the art. The silicon controlled rectifier 56 is rendered nonconductive, to deenergize the relay 180R upon the picking up of the relay S. When the relay S is deenergized between timing cycles, current flows in primary winding 63 of the transformer 61 by a circuit that extends from (+) and includes resistor 64, resistor 65, back contact 66 and the winding 63 to (−). When the back contact 66 opens, voltage is induced in the secondary winding in opposition to the voltage produced by the drop due to the current in the energizing circuit heretofore mentioned. It is this opposition voltage which reduces the current through the rectifier 56 and extinguishes it.

The trigger circuit 52 is comprised of a silicon controlled rectifier 67, a resistor 68, a resistor 70 and a diode 71 which are interconnected the same as the trigger circuit 50, and to the secondary winding 60 of the transformer 63. A relay 120R picks up in response to the conducting of the rectifier 67 as caused by the voltage spike from the timing circuit 22, and the relay 120R is deenergized at the beginning of the next timing period when the rectifier 67 is extinguished.

The trigger circuit 54 which is comprised of a silicon controlled rectifier 72, resistors 73 and 74 and diode 75, is connected in the same manner as the trigger circuits 50 and 52 to energize and deenergize a relay 75R in response to a voltage spike from the timing circuit 23, and the opposition voltage caused by the closing of back contact 66 of the relay S respectively.

The relays CHKP, 75RCP, 120RCP and 180RCP are biased neutral relays and are connected as will be described in connection with a description of the operation of the system so that any malfunction, short or open wire does not result in an unsafe operating condition.

The checking relay CHK, the periodic operation of which energizes the checking repeater relay CHKP, is normally energized when no code is being received. The energizing circuit for the relay CHK extends from (+) and includes back contact 46 of the relay ST, the lower plate of the capacitor 40, resistor 42, back contact 55 of the relay S, the upper plate of the capacitor 40, back contact 38 of the relay ST, the lower plate of the capacitor 33, resistor 35, back contact 53 of the relay S, the upper plate of the capacitor 33, back contact 31 of the relay ST, the lower plate of the capacitor 27, resistor 29, back contact 51 of the relay S, the upper plate of the capacitor 27, back contact 30 of the relay ST, back contact 17 of the relay CR, and the winding of the relay CHK to (−). This energizing circuit includes a circuit shorting the capacitors 27, 33, and 40, and resistors 29, 35 and 42 to insure that the capacitors are discharged and the resistors are intact.

At the beginning of a timing period when the relay CR picks up, the relay CHK is held energized by a stick circuit which extends from (+), and includes front contact 81 of the relay CHK, the front contact 17 of the relay CR, and the winding of the relay CHK to (−). During each timing period in response to the dropping away of the relay CR, the relay CHK is dropped away by the opening of the previously described stick circuit. Between timing periods, the relay CHK is picked up over its previously described energizing circuit in response to the dropping away of the relay CR and the relay ST.

When biased neutral relay CHKP is energized, relay 180RCP is held energized in response to the recurrent picking up and dropping away of the relay 180R; relay 120RCP is held energized in response to the recurrent picking up and dropping away of the relay 120R; and relay 75RCP is energized in response to the recurrent picking up and dropping away of the relay 75R. The relay CHKP is energized in response to the periodic picking up and dropping away of the relay CHK.

Figure 3:
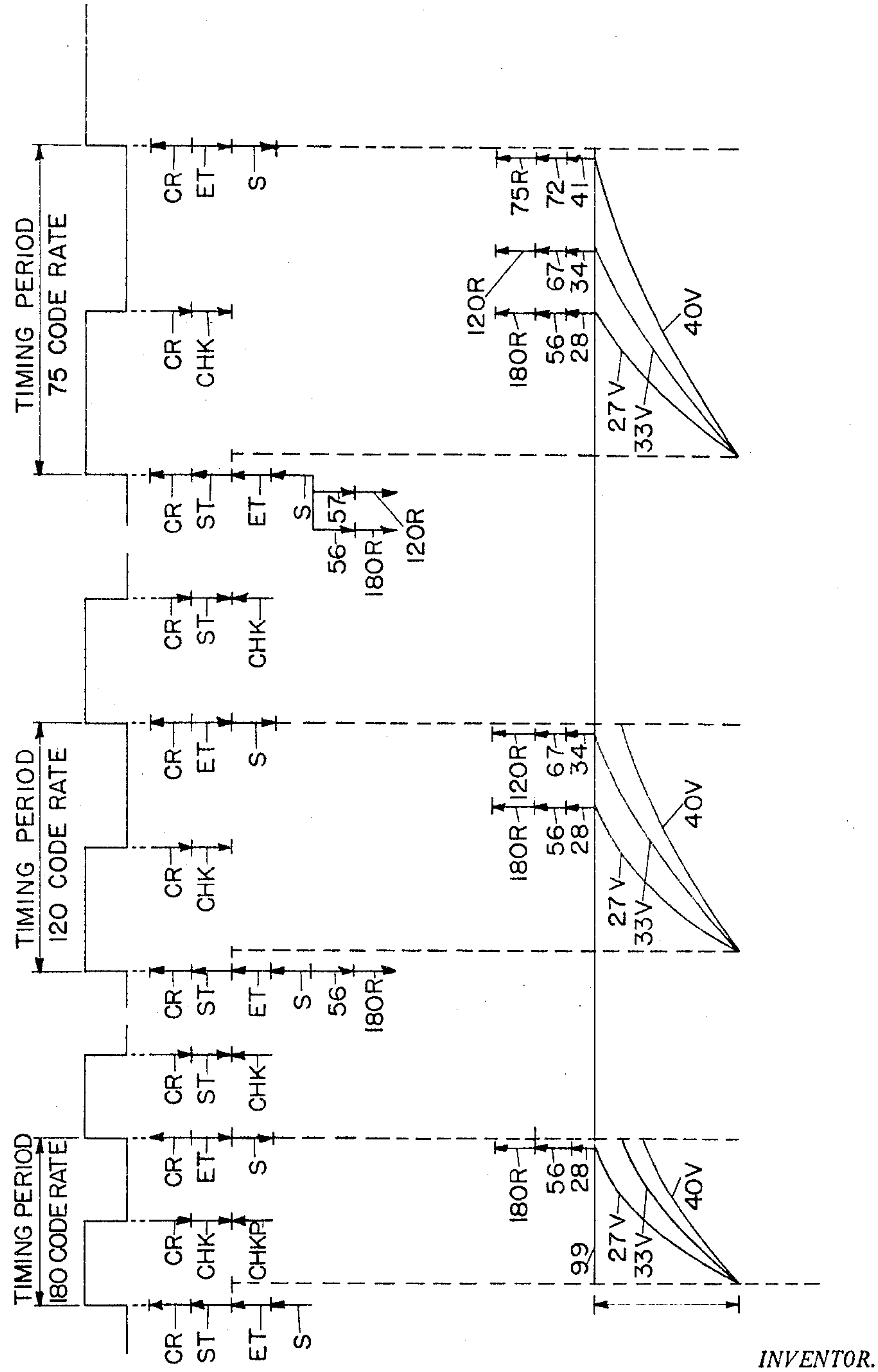

In operation, and assuming that no code is present in the rails of the track section 11 (FIG. 1), the cab signal 20 is caused to display its aspect R by a circuit which extends to (+) and includes back contact 82 of the relay 180RCP, the aspect R, and the resistor 83 to (−). The relay CR is deenergized and the relay CHK is energized as previously described. With reference to FIGS. 2 and 3, and assuming that the coding apparatus 10 of FIG. 1 commences impressing a carrier current on the rails of the track section 11 which recurs at a 180 code rate for example, the receiving coils 12 and 13 are influenced to cause the amplifier 15 to produce an output pulse at the same recurring rate. Under normal conditions, these pulses have a substantially equal "on" and "off" time, although the decoding apparatus of the present invention does not require such a normal operation in order to function properly.

In response to the first detected pulse from the amplifier 15, the relay CR is energized to cause the picking up of the relay ST by a circuit which extends from (+) and includes front contact 16 of the relay CR, and the lower winding of the relay ST to (—). In response to the picking up of the relay ST, the timing circuits 21, 22 and 23 are simultaneously turned "on" because of the closing of the front contacts 30, 31, 38 and 46 respectively to charge the capacitors of each timing circuit as previously described. At the same time, relay ET is energized by a circuit which extends from (+) and includes front contact 85 of the relay CHK, front contact 86 of the relay ST, and the winding of the relay ET to (—). The picking up of the relay ET energizes the relay S by a circuit which extends from (+) and includes the upper winding of the relay ST, the winding of the relay S in series, and front contact 87 of the relay ET to (—). The relay CHK is now held up by its previously described stick circuit.

When this pulse from the amplifier ceases, the relay CR is deenergized which causes the relay CHK to drop away. The dropping away of the relay CHK serves to open its front contact 85 and close its back contact 84 to provide the required operation of the system in response to the next picking up of the relay CR. The dropping away of the relay CHK in the first instance energizes its repeater relay CHKP by causing capacitor 90 to discharge through a circuit which includes the winding of the relay CHKP, back contact 91 of the relay CHK, resistor 92, and back contact 93 of the relay CHK to (—). A capacitor 94 in series with a resistor 95 maintains the relay CHKP energized during the time interval until the next time the relay CHK drops away. It should be noted that if the contacts 91 or 93 should weld open or closed, or the capacitor 90 shorts, that the relay CHKP cannot pick up. The shorting of the capacitor 90 would apply negative energy to the positive side of the biased neutral relay CHKP, and the welding of the contacts 91 or 93 would cause a short or an open circuit.

The timing circuit 21, which has the shortest time constant in the illustrated embodiment of the invention produces a voltage spike prior to the dropping away of the relay S at the end of a timing period for a 180 code rate. This voltage spike occurs as a result of the voltage building up to value represented by line 99 of FIG. 3. This voltage spike operates its trigger circuit 50 to energize the relay 180R. The picking up of the relay 180R charges a capacitor 96, if the relay CHKP is energized, by a circuit which extends from (+) and includes front contact 97 of the relay CHKP, adjustable resistor 98, front contact 100 and 101 of the relay 180R, and the capacitor 96 to (—). The next dropping away of the relay 180R at the beginning of the next timing period discharges the capacitor 96 through the winding of the relay 180RCP, back contact 100 and 101 of the relay 180R to (—). The coding or periodic picking up and dropping away of the relay 180R maintains the relay 180RCP energized by circuitry connected in the same manner, as that, wherein the recurring operation of the relay CHK maintains the relay CHKP energized as described. Front contact 102 and back contact 97 of the relays CHKP are in the circuit to permit the energization of the relay 180RCP in response to the coding of the relay 180R, only when the relay CHK is operating as intended.

When receiving the 180 code rate, the picking up of the relay CR at the end of each timing period causes the relay S to drop away prior to the time when the voltage spike is able to occur at the outputs of the timing circuits 22 and 23, and thus the relays 120R and 75R remain deenergized.

In response to the picking up of the relay CR at the end of the timing period, the relay ET is driven down by a drive down circuit which extends from (+) and includes front contact 16 of the relay CR, the back contact 84 of the relay CHK, front contact 103 of the relay ET and the lower winding of the relay ET to (—). The relay ET is held energized when the CR relay is deenergized during the timing period by a circuit which extends from (+) and includes resistor 104 and the upper winding of the relay ET to (—). The dropping away of the relay ET deenergized the relay S, which opens front contacts 51, 53 and 55 respectively of the relay S to disconnect the trigger circuits 50, 52 and 54.

At the end of that pulse which marks the end of a timing period or in other words, between timing periods, the relay CR drop away which drop away the relay ST and discharges the capacitors 27, 33 and 40 by the closing of back contacts 31, 38 and 45 of the relay ST. The closing of the back contact 17 of the relay CR and the back contact 30 of the relay ST completes the previously described energizing circuit to pick up the relay CHK. At the beginning of the next timing period, which is the next picking up of the relay CR, the relay ST is energized as previously described to again turn "on" the timing circuits 21, 22 and 23. The relay ET is also picked up, which picks up the relay S as previously mentioned. The picking up of the relay S turns "off" the silicon controlled rectifier 56, to drop away the relay 180R as previously described.

If the coding rate changes to a 120 code rate for example, the system operates as previously described with the exception that the timing period is extended thereby providing sufficient time for the capacitor 33 also to build up to the value sufficient to provide a voltage spike at the output of the timing circuit 22 to energize the relay 120R. Thus this relay 120R also codes in addition to the coding of the relay 180R. Similarly, for a 75 code rate the timing period is extended so that the capacitors 27, 33 and 40 of the timing circuits 21, 22 and 23 respectively, all cause their timing circuits to provide a voltage spike for energizing all the relays 180R, 120R and 75R. The building up of the voltage value for the capacitors 27, 33 and 40 during each timing period is represented by the curves referred to at 27V, 33V and 40V of FIG. 3.

If a relay 180R is coding to keep its 180RCP relay energized, the cab signal 20 displays an aspect Y by a circuit which extends from (+) and includes front contact 82 of the relay 180RCP, back contact 105 of the relay 120RCP, the aspect Y, back contact 106 of the relay 120RCP and the resistor 83 to (—). In the event the relay 120RCP is energized in response to a 120 code rate, the cab signal 20 is illuminated with the aspect *Y/G* by a circuit which extends from (+) and includes front contact 82 of the relay 180RCP, back contact 107 of the relay 75RCP, the aspect G, front contact 106 of the relay 120RCP, the aspect Y, and the front contact 105 of the relay 120RCP to (—). When the system is operating at a 75 code rate, the cab signal 20 is caused to display its aspect G by a circuit which extends from (+) and includes front contact 82 of the relay 180RCP, front contact 107 of the relay 75RCP, the aspect G, and the resistor 83 to (—).

Although the preceding description and the illustrations herein are believed to adequately describe and show the various circuit connections and arrangement of components as they relate to the fail safe features of the invention for the sake of emphasis certain typical malfunctions and defeats of individual components will be briefly summarized. As has been pointed out previously, the energized state of the relays RCP depend upon the recurrent closing and opening of the contacts of the relay R in their respective pickup circuits and the energized condition of the relay CHKP. If one of the contacts of relay R should be welded shut, such as front contact 100 or 101, for example, capacitor 96 cannot discharge through the winding of relay 180RCP. If back contact 100 or 101 is welded shut capacitor 96 cannot charge or in the alternative complete the circuit for discharging 96 through the winding of 180RCP.

If capacitor 96 should short out, the biased neutral relay 180RCP will not pick up.

Keeping in mind that the relays 180R, 120R and 75R must alternately pick up and drop away to obtain a condition less restrictive than the R aspect, if the trigger circuit 50 should continue to conduct or fail to conduct, the R relays will not so operate. If the relay S should stick up or down, the silicon controlled rectifiers will either stay "on" or "off." If the relay ET is stuck up in its energized condition, the relay ST cannot drop away, which would prevent the relay CHK from picking up between timing periods and it would not code. If the relay ET will not energize, the relay S cannot pick up. If the relay ST could not pick up, the timing circuits could not produce a voltage spike. If the resistors 29, 35 or 42 should become disconnected, the relay CHK will not pick up. Similarly, if the capacitors 33, 40 or 42 should short, or their plates should break, the circuit for firing the transistors 28, 34 or 41 for the respective timing circuit would remain open or the relay CHK will not pick up. Thus, this decoding apparatus is a dynamic system which requires periodic operation of each component and the failure of such operation results in a safe condition.

From the preceding description, it is apparent that the difference between the "on" and "off" times is unimportant to the proper operation of this system, inasmuch as it is caused to operate over a timing period which includes both an "on" and an "off" time and each operated condition of the code following means actively affects the system. Although the illustrated and described embodiment of the invention provides a timing period which extends from the occurrence of one pulse to the occurrence of the next pulse, it is contemplated that the system could be arranged such that the timing period could be between the end of one pulse and the end of the succeeding pulse.

Having thus shown and described a decoding apparatus for a continuous inductive coded system to operate a cab signal as one specific embodiment of the present invention, it is desired to be understood that various modifications, adaptations and alterations may be applied to the specific form shown to meet the requirements of practice, without in any manner departing from the spirit or scope of the present invention.

What is claim is:

1. In a continuous inductive system for a railway vehicle wherein time spaced pulses of electrical energy of a predetermined characteristic are transmitted recurrently from wayside to the vehicle at a selected one of a plurality of code rates to govern the operation of the vehicle in accordance with the rate of recurrence of the pulses, comprising means on the vehicle to receive each pulse, code following means operatively connected to the receiving means to operate to each one of two conditions in response to the reception of each pulse, a timing means for each one of the plurality of code rates effective when activated to produce an output after a time interval corresponding to a respective one of the plurality of code rates, means responsive to the operation of the code following means to one condition effective to activate each of the timing means only during alternate pulses, means controlled by the operation of the code following means to its other condition upon termination of each of the alternate pulses to cause deactivation of the timing means upon the subsequent operation of the code following means in response to a next pulse, and means responive to the recurrent output of each timing means occurring prior to each operation of the code following means to its one condition in response to said next pulses respectively to govern selectively the operation of the railway vehicle.

2. In a continuous inductive system for a railway vehicle wherein time spaced pulses of electrical energy of a predetermined characteristic are transmitted recurrently from wayside to the vehicle at a selected one of a plurality of code rates to govern the operation of the vehicle in accordance with the rate of recurrence of the pulses, comprising means on the vehicle effective to receive each pulse, code following means distinctively operated in response to each recurring output from the receiving means, timing means for each one of the plurality of code rates operative to produce a voltage output a corresponding time interval after each activation thereof, means responsive to the recurrent output from each timing means to selectively govern the vehicle, circuit means operatively connected to each timing means and the code following means effective to activate each timing means in response to only every other pulse that is received, and means governed by said circuit means effective to deactivate each of the timing means in response to a pulse following each of said alternate pulses, whereby the vehicle is selectively governed in accordance with those timing means producing an output between said alternate pulse and the pulses following the alternate pulses.

3. A decoding system for detecting the rate of a train of time spaced electrical pulses wherein a code following means operates to each of two conditions in response to the detection of each pulse of the train, comprising timing means operative to produce a momentary voltage output a predetermined time interval after each activation thereof, a trigger circuit means operative to produce an output voltage when activated by the momentary output of the timing circuit, control means operated to one condition in response to the output voltage of the trigger circuit means and operated to another condition in response to the cessation of the trigger circuit output voltage, indicating means operated only in response to the alternate operation of the control means to both of its conditions recurrently, activating means respnsive to the operation of the code following means to one condition only on alternate pulses to activate the timing means, means governed by the operation of the code following means to its other condition when the timing means is activated operative to deactivate the timing means in response to the next pulse following each of the alternate pulses, and means governed by the last named means and responsive to each operation of the code following means to its one condition in response to each of said alternate pulses to deactivate the trigger circuit means, whereby the control means is operated to one condition in response to the output voltage of the trigger circuit means and to its other condition upon cessation of said output voltage when said timing means is next actuated.

4. A system for providing a distinctive output in response to the reception of a train of time spaced electrical pulses below a predetermined rate wherein a code following means is operated to each of two conditions in response to the reception of a complete pulse, comprising a timing circuit operative from a deactivated condition to provide a momentary output voltage a predetermined time interval after being activated, a trigger circuit including a gating means operative when connected to the timing means to provide an output voltage in response to a momentary voltage applied to its gating means, a start circuit means effective when operated to activate the timing circuit means and operatively connect electrically the timing circuit means to the gating means, an end circuit means effective when operated to one condition to disconnect the timing circuit means from the gating means, a checking means controlled by the code following means operative to a reset condition when the timing means is activated and operative from its reset condition to a control condition when said timing means is activated for checking the integrity of said end circuit means, first circuit means responsive to each operation of the code following means to one of its conditions when the checking means is in its said control condition to activate the start circuit means, second circuit means responsive to each operation of the code following means to said one condition when the checking means is in its reset condition to operate the end circuit means to its said one condition, and means responsive to each operation of the start circuit means to shut off any output voltage from the trigger circuit means, whereby the momentary output voltage from the timing means is applied to the gating means only if the time interval between each successive operation of the code following means to said one condition is greater than said predetermined time interval and said output voltage is present during a time interval measured from the end of said predetermined time interval to the next operation of the start circuit means.

5. A system according to claim 4 including additionally a slow release relay means subject to actuation by energization of its winding in response to current flowing in one direction only, a capacitor electrically connected to discharge the capacitor through the winding of the relay in said one direction, and circuit means responsive to the occurrence of each output voltage of the trigger circuit means to charge the capacitor and responsive to the cessation of each output voltage to discharge the capacitor, whereby the relay means is maintained in its picked up position only if the output voltage occurs recurrently.

6. A system according to claim 5 including additionally a checking relay energized only in response to the recurrent operation of the checking means and circuit means effective to render the slow release relay energized in response to said recurrent output voltage only when the checking relay is energized.

7. A decoding system for detecting the rate of a train of time spaced electrical pulses wherein a code following means operates alternately to each of two conditions in response to the detection of each complete pulse, comprising a timing circuit means operative alternatively to activated and deactivated conditions respectively to produce a distinctive output a predetermined time interval after being activated, a trigger circuit means operative to produce a continuing output in response to the distinctive output from the timing circuit means when electrically connected thereto and operative to discontinue the said continuing output in response to a distinctive electrical input, a checking circuit means operated to a control condition in response to the operation of the code following means to one condition when the timing circuit means is deactivated and operated to a reset condition in response to the operation of the code following means to said one condition when the timing circuit means is activated, a start circuit means operative in response to the operation of the code following means to its other condition when the checking circuit means is in its control condition to activate the timing means, a first circuit means operative in response to the operation of the start circuit means when the checking circuit means is in said control condition to connect the trigger circuit means to the timing circuit means, means responsive to the operation of the code following means to its other condition when the checking circuit means is in its said reset condition to deactivate both said start circuit means and the first circuit means, and a third circuit means operative to provide a distinctive indication in response to the recurrent distinctive output of the trigger circuit means, whereby the third circuit means is operated to provide a distinctive indication only if at least each alternate time interval between successive operations of the code following means to its other condition exceeds said predetermined time interval.

8. In a system for decoding the rate of operation of a code following means that operates alternatively to each of two conditions in response to each complete pulse of electrical energy of a series of time spaced pulses, a source of energy, a resistor, a capacitor, a semiconductor binary device operatively connected to one plate of the capacitor to cause conduction of the semiconductor device when the voltage on said one plate reaches a predetermined value, timing period circuit means operative to close to connect said resistor and capacitor to the source of energy to charge the capacitor to said predetermined voltage value a predetermined time interval after being connected thereto and operative to open to disconnect said source of energy, circuit means including the semiconductor device and the plates of the capacitor for discharging the capacitor in response to the conducting of the semiconductor, a checking relay means for checking the operation of said timing period circuit means, energizing circuit means responsive to the operation of the code following means to one of its conditions when the timing period circuit means is open to energize the checking relay through a circuit checking the continuity of said circuit means for discharging the capacitor, stick circuit means including a front contact of the checking relay responsive to the operation of the code following means to its other condition to hold the checking relay energized, said stick circuit means being opened in response to the operation of the code following means to its one condition when the timing period circuit means is closed to deenergize the checking relay, circuit means including a contact of the checking relay in its energized condition operative to close the timing period circuit means in response to each operation of the code following means to the other of its conditions, and means responsive to the discharging of the capacitor upon each conducting of the semiconductor with the timing period circuit means closed to indicate when the predetermined time interval is less than the time between successive operations of the code following means to the other of its conditions.

9. In a system according to claim 8 including a control relay, a silicon controlled rectifier operative to alternately energize and deenergize the control relay in response to the respective conducting and non-conducting thereof, circuit means operative to render the silicon controlled rectifier to conduct in response to the discharging of the capacitor when the timing period circuit means is closed, and means responsive to the closing of the timing period circuit means to govern the silicon controlled rectifier to non-conduction.

10. In a system according to claim 9 including means operative to indicate that said predetermined time interval is less than the time between successive operations of the code following means to its other condition only when both the checking relay and the control relay is being energized and deenergized recurrently.

11. In a system according to claim 9 wherein the timing period circuit means includes means for rendering the silicon controlled rectifier conductive in response to the discharging of the capacitor.

References Cited by the Examiner

UNITED STATES PATENTS

| | | | |
|---|---|---|---|
| 2,399,668 | 5/1946 | Francis | 340—167 |
| 2,636,162 | 4/1953 | Sinclair | 340—167 |
| 2,697,823 | 12/1954 | Undy | 340—164 X |
| 2,731,552 | 1/1956 | Kendall et al. | 246—63 |
| 2,760,134 | 8/1956 | Johnson. | |

OTHER REFERENCES

SCR Manual (2nd Edition Published by General Electric, Auburn, N. Y.), Fig. 7.16, page 108.

ARTHUR L. LA POINT, *Primary Examiner.*

LEO QUACKENBUSH, *Examiner.*

S. B. GREEN, *Assistant Examiner.*